United States Patent
Wang et al.

(10) Patent No.: US 12,529,821 B2
(45) Date of Patent: Jan. 20, 2026

(54) OPTICAL FILMS BASED ON STYRENIC FLUOROPOLYMER AND ACRYLIC COPOLYMER

(71) Applicant: AKRON POLYMER SYSTEMS, INC., Akron, OH (US)

(72) Inventors: Peiyao Wang, Hudson, OH (US); Frank Harris, Boca Raton, FL (US); Thauming Kuo, Kingsport, TN (US); Wentao Li, Kingsport, TN (US); Alan Phillips, Johnson City, TN (US); Bin Wang, Kingsport, TN (US); Dong Zhang, Hudson, OH (US); Xiaoliang Zheng, Hudson, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 411 days.

(21) Appl. No.: 18/260,694

(22) PCT Filed: Dec. 14, 2021

(86) PCT No.: PCT/US2021/063289
§ 371 (c)(1),
(2) Date: Jul. 7, 2023

(87) PCT Pub. No.: WO2022/132755
PCT Pub. Date: Jun. 23, 2022

(65) Prior Publication Data
US 2024/0061149 A1    Feb. 22, 2024

Related U.S. Application Data

(60) Provisional application No. 63/126,465, filed on Dec. 16, 2020.

(51) Int. Cl.
  G02B 1/04      (2006.01)
  C08J 5/18      (2006.01)
  G02B 5/30      (2006.01)
  G02F 1/1343    (2006.01)
  H10K 59/50     (2023.01)

(52) U.S. Cl.
  CPC ...... *G02B 1/04* (2013.01); *C08J 5/18* (2013.01); *G02B 5/3083* (2013.01); *C08J 2333/12* (2013.01); *G02F 1/134363* (2013.01); *H10K 59/50* (2023.02)

(58) Field of Classification Search
  CPC ... G02B 1/04; G02B 1/08; G02B 5/30; G02B 5/3083; C08J 5/18; C08J 2333/12; C08J 2425/18; H10K 59/50; H10K 59/8793; H10K 50/10; H10K 59/10; H10K 59/122; G02F 1/134363; G02F 1/13363; B29C 55/04; B29C 55/12; B29C 48/0018; B29C 48/022; B29C 48/08; B29K 2033/12; B29L 2007/00; B29L 2011/00; C08L 25/18; C08L 33/12; C08F 112/20; C08F 220/14

See application file for complete search history.

(56) References Cited

U.S. PATENT DOCUMENTS

| | | | |
|---|---|---|---|
| 8,802,238 B2 * | 8/2014 | Zheng | C08J 7/043 524/544 |
| 10,088,615 B2 | 10/2018 | Zheng et al. | |
| 10,125,250 B2 * | 11/2018 | Zheng | C08F 8/30 |
| 2011/0262663 A1 | 10/2011 | Choi et al. | |
| 2014/0350166 A1 | 11/2014 | Zheng et al. | |

FOREIGN PATENT DOCUMENTS

| | | |
|---|---|---|
| CN | 108369312 A | 8/2018 |
| KR | 1020080004720 A | 1/2008 |
| TW | 201829169 A | 8/2018 |
| WO | 2016118873 A1 | 7/2016 |

OTHER PUBLICATIONS

ASTM International, Standard Test Method for Transition Temperatures and Enthalpies of Fusion and Crystallization of Polymers by Differential Scanning Calorimetry, Jun. 30, 2015, pp. 1-7.
Extended European Search Report for EP Application No. 21907622.1, dated Oct. 14, 2024, 10 pages.
Fedelich, et al., Application Handbook, Thermal Analysis of Polymers, Selected Applications, Jan. 1, 2013, pp. 1-40, Mettler-Toledo AG.
Office Action from Taiwanese Application No. 110146866 dated Jun. 19, 2025, 6 pages.

* cited by examiner

*Primary Examiner* — Stephone B Allen
*Assistant Examiner* — Adam W Booher
(74) *Attorney, Agent, or Firm* — Calfee, Halter & Griswold

(57) ABSTRACT

Optical compensation films based on polymer blends formed from particular compositions of a styrenic fluoropolymer and acrylic copolymers are provided. The optical compensation films have desirable mechanical and optical properties such as haze, elongation at break, Young's modulus, in-plane retardation, and out-of-plane retardation. The optical compensation films are suitable for use in display devices such as those in televisions, computers, automobiles, and mobile phones.

20 Claims, No Drawings

OPTICAL FILMS BASED ON STYRENIC FLUOROPOLYMER AND ACRYLIC COPOLYMER

CROSS-REFERENCE TO RELATED APPLICATIONS

This application is a 371 Application of International Patent Application No. PCT/US2021/063289, filed Dec. 14, 2021, which claims priority to and the benefit of U.S. Provisional Patent Application No. 63/126,465, filed Dec. 16, 2020, the entire contents of which are incorporated by reference herein.

FIELD

This invention relates to an optical compensation film that is based on a styrenic fluoropolymer and an acrylic copolymer. The styrenic fluoropolymer has exceptionally good compatibility with particular acrylic copolymer compositions. Polymer films prepared from the styrenic fluoropolymer and acrylic copolymer compositions disclosed herein provide desirable mechanical and optical properties such as haze, elongation at break, Young's modulus, in-plane retardation, and out-of-plane retardation. The polymer film of the present invention can be used as an optical compensation film in display devices such as those in televisions, computers, automobiles, and mobile phones.

BACKGROUND

It is well known in the art that polymer films can be used as optical compensation films in display devices such as those in mobile phones and televisions to improve viewing quality. Such polymer films must have exceptionally good optical clarity as well as certain in-plane and out-of-plane retardation values in order to compensate for the phase differences resulting from light traveling at various angles in a display device such as a liquid crystal display (LCD).

In order to obtain the desired retardation values, two polymers with different physical and optical properties are often required. First, the two polymers are mixed by blending or extrusion to yield a polymer film. The film thus obtained is then stretched to produce the desired in-plane and out-of-plane retardation values. This can only be achieved by using two polymers with exceptionally good compatibility in addition to having the required optical properties. Otherwise, the polymer film cannot meet the stringent clarity requirement. U.S. Pat. No. 10,088,615 (hereinafter "the '615 patent") discloses that styrenic fluoropolymers, such as poly($\alpha,\beta,\beta$-trifluorostyrene), have exceptionally poor compatibility with common polymers, such as polyimide, polyamide, polyester, cellulose ester, and cyclic polyolefin (COP), presumably due to their lack of polar groups to interact with the functionalities in other polymers as well as their inability to form hydrogen bonds. Attempts to mix the styrenic fluoropolymer solution with other polymer solutions have typically resulted in heterogeneous mixtures or hazy solutions; thus, polymer films with good clarity are difficult to prepare. The '615 patent also discloses that certain acrylic polymers have surprisingly good compatibility with the styrenic fluoropolymer. Clear, homogeneous solutions can be prepared, and their cast polymer films have high light transmittances suitable for application in optical devices. However, the '615 patent does not disclose polymer compositions that are capable of providing optical compensation films with specific mechanical and optical properties such as elongation at break, Young's modulus, in-plane retardation, and out-of-plane retardation. Further, the film must exhibit good thermal and mechanical properties in order to endure the harsh stretching conditions. Finally, the film can only be useful if it meets the retardation specification. Thus, the discovery of such materials requires a technical breakthrough.

SUMMARY

Disclosed herein are optical compensation films based on polymer blends formed from particular compositions of poly($\alpha,\beta,\beta$-trifluorostyrene) and an acrylic copolymer. The optical compensation films provide desirable mechanical and optical properties such as haze, elongation at break, Young's modulus, in-plane retardation, and out-of-plane retardation such that the optical compensation films are particularly useful in a variety of display devices such as those in televisions, computers, automobiles, and mobile phones.

In accordance with the invention of the present disclosure, optical compensation films are disclosed. The optical compensation films of the invention comprise:
  a. poly($\alpha,\beta,\beta$-trifluorostyrene); and
  b. an acrylic copolymer prepared by polymerization of monomers comprising:
    i. methyl methacrylate (MMA) in an amount of 70 wt. % to 95 wt. %, based on the total weight of (i) and (ii); and
    ii. one or more ethylenically unsaturated monomers other than MMA selected from the group comprising methyl acrylate, ethyl acrylate, n-butyl acrylate, n-hexyl acrylate, n-hexyl methacrylate, 2-methoxyethyl acrylate, 2-ethylhexyl acrylate, and 2-ethylhexyl methacrylate in an amount of 5 wt. % to 30 wt. %, based on the total weight of (i) and (ii),
  wherein the acrylic copolymer has a glass transition temperature ($T_g$) of 65° C. to 98° C., and wherein the optical compensation film has a haze of less than 2.25%, an elongation at break of 5% to 15%, and a Young's modulus of 2 GPa to 4 GPa, measured at a film thickness of 15 μm to 50 μm.

In accordance with the present disclosure, the optical compensation films may be uniaxially or biaxially stretched. In embodiments, the stretched optical compensation film is a negative A-plate or a positive biaxial film having an in-plane retardation ($R_e$) of −80 nm to −300 nm and an out-of-plane retardation ($R_{th}$) of 40 nm to 200 nm at a film thickness of 15 μm to 30 μm measured at a light wavelength of 550 nm. In embodiments, the stretched optical compensation film is a negative A-plate or a positive biaxial film having an in-plane retardation ($R_e$) of −100 nm to −200 nm and an out-of-plane retardation ($R_{th}$) of 50 nm to 150 nm at a film thickness of 15 μm to 30 μm measured at a light wavelength of 550 nm. In embodiments, the stretched optical compensation film is a positive C-plate having an in-plane retardation ($R_e$) of −10 nm to 10 nm and an out-of-plane retardation ($R_{th}$) of 50 nm to 150 nm at a film thickness of 15 μm to 30 μm measured at a light wavelength of 550 nm.

In accordance with the present disclosure, a multilayer film is provided. In embodiments, the multilayer film comprises an optical compensation film of the present invention, which is a negative A-plate or a positive C-plate, and a positive A-plate having a refractive index profile of $n_x > n_y = n_z$, wherein $n_x$ and $n_y$ represent the in-plane refractive indices, and $n_z$ represents the thickness refractive index. In embodiments, the multilayer film comprises an optical compensation film of the present invention, which is a positive biaxial film, and a negative biaxial film having a refractive index profile of $n_x>n_y>n_z$, wherein $n_x$ and $n_y$ represent the in-plane refractive indices, and $n_z$ represents the thickness refractive index.

Other aspects of the present disclosure will be apparent from the description that follows.

DETAILED DESCRIPTION

Described herein are optical compensation films based on polymer blends formed from particular compositions of poly(α,β,β-trifluorostyrene) and an acrylic copolymer. The inventors have unexpectedly found that particular compositions of poly(α,β,β-trifluorostyrene) and an acrylic copolymer provide an optical compensation film having desirable mechanical and optical properties such as haze, elongation at break, Young's modulus, in-plane retardation, and out-of-plane retardation.

In accordance with the invention of the present disclosure, there is provided an optical compensation film comprising:
  a. poly(α,β,β-trifluorostyrene); and
  b. an acrylic copolymer prepared by polymerization of monomers comprising:
    i. methyl methacrylate (MMA) in an amount of 70 wt. % to 95 wt. %, based on the total weight of (i) and (ii); and
    ii. one or more ethylenically unsaturated monomers other than MMA selected from the group comprising methyl acrylate, ethyl acrylate, n-butyl acrylate, n-hexyl acrylate, n-hexyl methacrylate, 2-methoxyethyl acrylate, 2-ethylhexyl acrylate, 2-ethylhexyl methacrylate, and combinations thereof, in an amount of 5 wt. % to 30 wt. %, based on the total weight of (i) and (ii),
  wherein the acrylic copolymer has a glass transition temperature ($T_g$) of 65° C. to 98° C., and wherein the optical compensation film has a haze of less than 2.25%, an elongation at break of 5% to 15%, and a Young's modulus of 2 GPa to 4 GPa, measured at a film thickness of 15 μm to 50 μm.

In accordance with some aspects of the invention of the present disclosure, there is provided an optical compensation film comprising:
  a. poly(α,β,β-trifluorostyrene); and
  b. an acrylic copolymer prepared by polymerization of monomers comprising:
    i. methyl methacrylate (MMA) in an amount of 80 wt. % to 90 wt. %, based on the total weight of (i) and (ii); and
    ii. one or more ethylenically unsaturated monomers other than MMA selected from the group consisting of methyl acrylate, ethyl acrylate, n-butyl acrylate, 2-ethylhexyl acrylate, 2-ethylhexyl methacrylate, and combinations thereof, in an amount of 10 wt. % to 20 wt. %, based on the total weight of (i) and (ii),
  wherein the acrylic copolymer has a glass transition temperature ($T_g$) of 85° C. to 98° C., and wherein the optical compensation film has a haze of less than 0.5%, an elongation at break of 7% to 15%, and a Young's modulus of 2.5 GPa to 3.5 GPa, measured at a film thickness of 15 μm to 50 μm.

The poly(α,β,β-trifluorostyrene) present in the optical compensation film is the homopolymer of the monomer, α,β,β-trifluorostyrene, having structural formula (1).

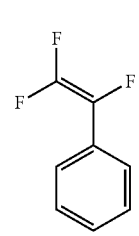

Methods for the preparation of poly(α,β,β-trifluorostyrene) (PTFS) are known in the art and have been disclosed in, for example, U.S. Pat. No. 8,871,882, the entire content of which is incorporated by reference herein. In accordance with some aspects, the PTFS present in the optical compensation film of the present disclosure has a weight average molecular weight ($M_w$) of 200,000 g/mole to 800,000 g/mole, including a $M_w$ of 225,000 g/mole to 750,000 g/mole, a $M_w$ of 250,000 g/mole to 700,000 g/mole, a $M_w$ of 275,000 g/mole to 650,000 g/mole, a $M_w$ of 300,000 g/mole to 600,000 g/mole, a $M_w$ of 325,000 g/mole to 550,000 g/mole, a $M_w$ of 350,000 g/mole to 500,000 g/mole, a $M_w$ of 375,000 g/mole to 450,000 g/mole, and also including a $M_w$ of 390,000 g/mole to 425,000 g/mole, as measured (polystyrene equivalent) by gel permeation chromatography (GPC). In accordance with some aspects, the PTFS present in the optical compensation film of the present disclosure has a glass transition temperature ($T_g$) of 200° C. to 220° C., including a $T_g$ of 200° C. to 215° C., a $T_g$ of 200° C. to 210° C., and also including a $T_g$ of 202° C. to 208° C., as determined by differential scanning calorimetry (DSC). In accordance with some aspects, the PTFS present in the optical compensation film of the present disclosure has a $M_w$ of 390,000 g/mole to 425,000 g/mole and a $T_g$ of 202° C. to 208° C.

The acrylic copolymer present in the optical compensation film is a copolymer of methyl methacrylate (MMA) and one or more ethylenically unsaturated monomers other than MMA selected from the group comprising, or consisting of, methyl acrylate, ethyl acrylate, n-butyl acrylate, n-hexyl acrylate, n-hexyl methacrylate, 2-methoxyethyl acrylate, 2-ethylhexyl acrylate, 2-ethylhexyl methacrylate, and combinations thereof. Other suitable monomers include ethyl methacrylate, isobutyl acrylate, isobutyl methacrylate, n-octyl acrylate, n-octyl methacrylate, iso-octyl acrylate, and iso-octyl methacrylate. Desirably, the alkyl group of the acrylate or methacrylate monomers other than MMA has less than 8 carbon atoms. In one aspect, the acrylic copolymer present in the optical compensation film is a copolymer of MMA and one or more other monomers selected from the group consisting of methyl acrylate, ethyl acrylate, n-butyl acrylate, and 2-ethylhexyl acrylate.

In accordance with some aspects of the optical compensation film described herein, the amount of poly(α,β,β-trifluorostyrene) present in the optical compensation film may be from 10 wt. % to 60 wt. %, including from 20 wt. % to 50 wt. %, from 25 wt. % to 45 wt. %, and also including from 30 wt. % to 40 wt. %, wherein the wt. % is based on the total weight of the poly(α,β,β-trifluorostyrene) and the acrylic copolymer present in the optical compensation film. Similarly, in accordance with some aspects of the optical compensation film described herein, the amount of acrylic copolymer present in the optical compensation film may be from 40 wt. % to 90 wt. %, including from 50 wt. % to 80 wt. %, from 55 wt. % to 75 wt. %, and also including from 60 wt. % to 70 wt. %, wherein the wt. % is based on the total weight of the poly(α,β,β-trifluorostyrene) and the acrylic copolymer present in the optical compensation film. In accordance with some aspects of the optical compensation film described herein, the amount of poly(α,β,β-trifluorostyrene) present in the optical compensation film may be from 25 wt. % to 45 wt. % and the amount of the acrylic copolymer present in the optical compensation film may be from 55 wt. % to 75 wt. %, wherein the wt. % is based on the total weight of the poly(α,β,β-trifluorostyrene) and the acrylic copolymer present in the optical compensation film. In accordance with some aspects of the optical compensation film described herein, the amount of poly(α,β,β-trifluorostyrene) present in the optical compensation film may be from 30 wt. % to 45 wt. % and the amount of the acrylic copolymer present in the optical compensation film may be from 55 wt. % to 70 wt. %, wherein the wt. % is based on the total weight of the poly(α,β,β-trifluorostyrene) and the acrylic copolymer present in the optical compensation film.

As mentioned above, the acrylic copolymer present in the optical compensation film is a copolymer of MMA and one or more ethylenically unsaturated monomers other than MMA selected from the group comprising, or consisting of, methyl acrylate, ethyl acrylate, n-butyl acrylate, n-hexyl acrylate, n-hexyl methacrylate, 2-methoxyethyl acrylate, 2-ethylhexyl acrylate, 2-ethylhexyl methacrylate, and combinations thereof. The amount of MMA present in the acrylic copolymer of the present disclosure may be from 70 wt. % to 95 wt. %, including from 75 wt. % to 93 wt. %, and also including from 80 wt. % to 90 wt. %, wherein the wt. % is based on the total weight of the MMA and the one or more ethylenically unsaturated monomers other than MMA present in the acrylic copolymer. Similarly, the amount of the one or more ethylenically unsaturated monomers other than MMA present in the acrylic copolymer of the present disclosure may be from 5 wt. % to 30 wt. %, including from 7 wt. % to 25 wt. %, and also including from 10 wt. % to 20 wt. %, wherein the wt. % is based on the total weight of the MMA and the one or more ethylenically unsaturated monomers other than MMA present in the acrylic copolymer. In accordance with some aspects of the present disclosure, the amount of MMA present in the acrylic copolymer may be from 80 wt. % to 90 wt. % and the amount of the one or more ethylenically unsaturated monomers other than MMA present in the acrylic copolymer may be from 10 wt. % to 20 wt. %, wherein the wt. % is based on the total weight of the MMA and the one or more ethylenically unsaturated monomers other than MMA present in the acrylic copolymer.

The acrylic copolymer present in the optical compensation film of the present disclosure has a glass transition temperature ($T_g$) of 65° C. to 98° C., as determined by differential scanning calorimetry (DSC). In accordance with some aspects of the present disclosure, the acrylic copolymer may have a $T_g$ of 70° C. to 98° C., including a $T_g$ of 75° C. to 98° C., a $T_g$ of 80° C. to 98° C., a $T_g$ of 85° C. to 98° C., and also including a $T_g$ of 90° C. to 93° C. In accordance with certain aspects of the present disclosure, the acrylic copolymer present in the optical compensation film of the present disclosure has a $T_g$ of 85° C. to 98° C. In accordance with certain aspects of the present disclosure, the acrylic copolymer present in the optical compensation film of the present disclosure has a $T_g$ of 90° C. to 93° C.

The acrylic copolymer of the present disclosure may be prepared using well-known methods in the art. For example, acrylic copolymers of MMA and one or more ethylenically unsaturated monomers may be prepared by a known polymerization technique including, but not limited to, bulk polymerization, solution polymerization, emulsion polymerization, or suspension polymerization. Furthermore, the polymerization reaction may be a free radical polymerization, a cationic polymerization, an anionic polymerization, a zwitterionic polymerization, a Ziegler-Natta polymerization, or an atom transfer radical polymerization.

The optical compensation film of the present disclosure has desirable optical and mechanical properties that enable the optical compensation film to be utilized in a variety of display devices such as those in televisions, computers, automobiles, and mobile phones, just to name a few.

One desirable optical property exhibited by the optical compensation film of the present disclosure is low haze. In accordance with the present disclosure, the optical compensation film has a haze of less than 2.25%, including from 0.02% to 2.25%. In embodiments of the present disclosure, the optical compensation film has a haze of less than 1.5% (e.g., from 0.02% to 1.5%), including a haze of less than 1% (e.g., from 0.02% to 1%), less than 0.5% (e.g., from 0.02% to 0.5%), less than 0.4% (e.g., from 0.02% to 0.4%), less than 0.3% (e.g., from 0.02% to 0.3%), less than 0.2% (e.g., from 0.02% to 0.2%), and also including a haze of less than 0.15% (e.g., from 0.02% to 0.15%). The aforementioned haze values of the optical compensation film are measured at a film thickness of 15 μm to 50 μm. The haze values described herein are determined in accordance with ASTM D1003-00.

The optical compensation film of the present disclosure also exhibits excellent mechanical properties. In accordance with the present disclosure, the optical compensation film has an elongation at break of 5% to 15%, including from 7% to 15%, and also including from 9% to 15%. The optical compensation film of the present disclosure also has a Young's modulus of 2 GPa to 4 GPa, including from 2.3 GPa to 3.5 GPa, from 2.5 GPa to 3.5 GPa, from 2.6 GPa to 3.5 GPa, and also including a Young's modulus of 2.7 GPa to 3.5 GPa. The aforementioned mechanical properties of the optical compensation film are measured at a film thickness of 15 μm to 50 μm. The elongation at break values and the Young's modulus values described herein are determined in accordance with ASTM D882-02.

The optical compensation film of the present disclosure may be prepared by solution cast of a blend of the poly(α,β,β-trifluorostyrene) (PTFS) and the acrylic copolymer in a solvent, or by hot melt extrusion of a blend of the PTFS and the acrylic copolymer. The casting of a polymer solution onto a substrate may be carried out by a method known in the art including, but not limited to, spin coating, spray coating, roll coating, curtain coating, or dip coating. Melt extrusion may be carrier out by mixing the PTFS and the acrylic copolymer in powder or pellet form before extrusion or by co-extrusion of the solid forms of the PTFS and the acrylic copolymer. The PTFS and the acrylic copolymer may be mixed or co-extruded at a desirable ratio such as, for example, 30:70 or 40:60 PTFS to acrylic copolymer. To improve compatibility, a master batch of the compounding may be first prepared by using a higher ratio of PTFS, for example, at a 70:30 PTFS to acrylic copolymer. Further compounding may then be carried out repeatedly by adding additional amounts of the acrylic copolymer to reach the final desired ratio of PTFS to acrylic copolymer. In addition, additives may be used in the extrusion process to reduce film defects by facilitating flow and mixing. One suitable additive for use in the extrusion process is Kynar® PVDF polymer processing aid additive, which is commercially available from Arkema Inc. (King of Prussia, Pennsylvania).

Suitable solvents for making solutions containing the PTFS and the acrylic copolymer include, but are not limited to toluene, methyl isobutyl ketone, cyclopentanone, methylene chloride, chloroform, 1,2-dichloroethane, methyl amyl ketone, methyl ethyl ketone, methyl isopropyl ketone, methyl isoamyl ketone, ethyl acetate, n-butyl acetate, propylene glycol methyl ether acetate, and mixtures thereof. Methods for casting polymer films from solutions containing styrenic fluoropolymer have been disclosed in U.S. Pat. No. 8,889,043, the entire content of which is incorporated by reference herein.

The optical compensation film of the present invention may be stretched by a method known in the art to obtain a desired in-plane retardation ($R_e$) value, a desired out-of-plane retardation ($R_{th}$) value, or both a desired in-plane retardation ($R_e$) value and a desired out-of-plane retardation ($R_{th}$) value. Suitable methods for stretching include uniaxial stretching and biaxial stretching. The optical compensation film of the present invention is especially suitable for stretching as compared to acrylic films, which are typically too brittle to be stretched adequately.

Retardation (R) of an optical compensation film (or wave plate) is defined as $R=\Delta n \times d$, wherein $\Delta n$ is the birefringence and d is the thickness of the wave plate. Birefringence is classified into in-plane birefringence $\Delta n(in)=n_x-n_y$, and out-of-plane birefringence $\Delta n(th)=n_z-(n_x+n_y)/2$, wherein $n_x$ and $n_y$ represent in-plane refractive indices and $n_z$ the thickness-direction refractive index. Thus, in-plane retardation is represented by $R_e=(n_x-n_y) \times d$, and out-of-plane retardation, $R_{th}=[n_z-(n_x+n_y)/2] \times d$.

Birefringence ($\Delta n$) (or retardation, R) of a wave plate may be measured by determining the birefringence of a wave plate over a wavelength range of about 400 nm to about 800 nm at various increments. Alternatively, birefringence may be measured at a specific light wavelength.

It is known that the crossed polarizers used in a display, such as the in-plane-switching (IPS) mode of a liquid crystal display (LCD), require a wave plate to compensate for the phase changes of the off-angle lights. Optical compensation films having negative in-plane retardation can be used for such a purpose. Such an optical compensation film having a negative in-plane retardation is commonly referred to as negative A-plate having a refractive index profile of $n_x<n_y=n_z$. One way to compensate for the crossed polarizers is to use a negative A-plate in combination with a positive A-plate having a refractive index profile of $n_x>n_y=n_z$.

Another way to compensate for the crossed polarizers is to use an optical compensation film having a refractive index profile of $n_x<n_y<n_z$, which is commonly referred to as a positive biaxial film. Such an optical compensation film can provide in-plane retardation as well as out-of-plane retardation. The positive biaxial film can be used in combination with a negative biaxial film having a refractive index profile of $n_x>n_y>n_z$.

It has been found that a negative A-plate can be obtained by non-constraint uniaxial stretching of the optical compensation film of this invention, while a positive biaxial film can be obtained by uniaxial stretching with constraint.

Thus, in some aspects, the optical compensation film of the present invention may be stretched to provide a negative A-plate having a refractive index profile of $n_x<n_y=n_z$ or a positive biaxial film having a refractive index profile of $n_x<n_y<n_z$. The negative A-plate or positive biaxial film has an in-plane retardation ($R_e$) of −80 nm to −300 nm and an out-of-plane retardation ($R_{th}$) of 40 nm to 200 nm at a film thickness of 15 μm to 30 μm, measured at the light wavelength of 550 nm. In certain aspects, the negative A-plate or the positive biaxial film of the present invention has an in-plane retardation ($R_e$) of −100 nm to −200 nm and an out-of-plane retardation ($R_{th}$) of 50 nm to 150 nm at a film thickness of 15 μm to 30 μm, measured at the light wavelength of 550 nm.

The optical compensation film of the present invention may be utilized in a multilayer optical compensation film. In certain aspects, a multilayer optical compensation film is provided that comprises a negative A-plate of the present invention and a positive A-plate having a refractive index profile of $n_x>n_y=n_z$. In certain aspects, a multilayer optical compensation film is provided that comprises a positive biaxial film of the present invention and a negative biaxial film having a refractive index profile of $n_x>n_y>n_z$. Examples of the positive A-plate or negative biaxial film include, but are not limited to, stretched polymer films of polycarbonate, cyclic olefin polymer (COP), polyester, or cellulose ester.

The crossed polarizers used in a display may also be compensated by using an optical compensation film having a refractive index profile of $n_x=n_y<n_z$, which is commonly referred to as a positive C-plate. Such an optical compensation film can provide a positive out-of-plane retardation. The positive C-plate may also be used in combination with a positive A-plate having a refractive index profile of $n_x>n_y=n_z$. It has been surprisingly found that a positive C-plate can be obtained by biaxial stretching of the optical compensation film of the present invention.

Thus, in some aspects, the optical compensation film of the present invention may be biaxially stretched to provide a positive C-plate having a refractive index profile of $n_x=n_y<n_z$. The positive C-plate has an in-plane retardation ($R_e$) of −10 nm to 10 nm and an out-of-plane retardation ($R_{th}$) of 50 nm to 150 nm at a film thickness of 15 μm to 30 μm, measured at the light wavelength of 550 nm.

In certain aspects, a multilayer optical compensation film is provided that comprises the positive C-plate of the present invention and a positive A-plate having a refractive index profile of $n_x>n_y=n_z$. Examples of the positive A-plate include, but are not limited to, stretched polymer films of polycarbonate, cyclic olefin polymer (COP), polyester, or cellulose ester.

The multilayer optical compensation films of the present invention may be used in display devices such as those in televisions, computers, automobiles, and mobile phones. Thus, in another aspect, the present invention provides an in-plane-switching (IPS) mode liquid crystal display (LCD) comprising a multilayer optical compensation film of the present invention. In yet another aspect, the present invention provides an organic light emitting diode (OLED) display comprising a multilayer optical compensation film of the present invention.

EXAMPLES

The following examples describe and demonstrate embodiments of compositions, films, and methods described herein. These examples are provided solely for the purpose of illustration and are not to be construed as limitations of the present disclosure, as many variations thereof are possible without departing from the spirit and scope of the present disclosure.

Example 1

Preparation of Poly(α,β,β-trifluorostyrene) and Acrylic Copolymers

Poly(α,β,β-trifluorostyrene) (PTFS) was prepared by emulsion polymerization of α,β,β-trifluorostyrene in the presence of sodium dodecyl sulfate and dodecylamine hydrochloride in accordance with the method disclosed in U.S. Pat. No. 8,871,882. The glass transition temperature ($T_g$) of the PTFS polymer was 208° C. as measured by Differential Scanning Calorimetry (DSC). The intrinsic viscosity (IV) of the PTFS polymer was 1.1 dL/g, as measured by a Cannon auto capillary viscometer using cyclopentanone as the solvent at 30° C. Unless it is otherwise specified, the PTFS polymer used throughout the Examples had an IV of about 1.1 dL/g.

Acrylic copolymers were prepared by solution free radical polymerization in accordance with a common method known in the art. In a typical reaction, MMA and another monomer at a specified ratio were dissolved in the solvent, dimethyl sulfoxide (DMSO), along with the initiator, azobisisobutyronitrile (AIBN) (about 1% based on the total weight of the monomers); the resulting mixture was degassed and refilled with nitrogen. The solution was then heated to 60° C. and allowed to react for about 48 hours. After the reaction, the mixture was precipitated into methanol, filtered, washed repeatedly with methanol, and dried under vacuum. The acrylic copolymers thus obtained are listed in Tables 1-4.

Table 1 lists the compositions of the copolymers of methyl methacrylate (MMA) with methyl acrylate (MA) at various ratios and their IV and $T_g$ values.

TABLE 1

Copolymers of MMA and MA

| Acrylic Copolymer | Composition by weight (charge), % | | IV | Tg (° C.) |
|---|---|---|---|---|
| ID | MMA | MA | (dL/g) | by DSC |
| 1 | 80 | 20 | 0.62 | 93 |
| 2 | 78 | 22 | 0.68 | 90 |
| 3 | 70 | 30 | 0.68 | 78 |

Table 2 lists the compositions of the copolymers of methyl methacrylate (MMA) with ethyl acrylate (EA) at various ratios and their IV and $T_g$ values.

TABLE 2

Copolymers of MMA and EA

| Acrylic Copolymer | Composition by NMR, weight % | | IV | Tg (° C.) |
|---|---|---|---|---|
| ID | MMA | EA | (dL/g) | by DSC |
| 4 | 85 | 15 | 0.97 | 97 |
| 5 | 82 | 18 | 1.19 | 94 |
| 6 | 84 | 16 | 0.59 | 90 |
| 7 | 82 | 18 | 0.64 | 88 |
| 8 | 75 | 25 | 0.60 | 76 |

Table 3 lists the compositions of the copolymers of methyl methacrylate (MMA) with butyl acrylate (BA) at various ratios and their IV and $T_g$ values.

TABLE 3

Copolymers of MMA and BA

| Acrylic Copolymer | Composition by NMR, weight % | | IV | Tg (° C.) |
|---|---|---|---|---|
| ID | MMA | BA | (dL/g) | by DSC |
| 9 | 90 | 10 | 0.53 | 106 |
| 10 | 87 | 13 | 0.52 | 97 |
| 11 | 84 | 16 | 0.52 | 90 |
| 12 | 84 | 16 | 0.62 | 90 |
| 13 | 82 | 18 | 0.58 | 83 |

Table 4 lists the compositions of the copolymers of methyl methacrylate (MMA) with various comonomers and their IV and $T_g$ values.

TABLE 4

Copolymers of MMA and Various Comonomers

| Acrylic Copolymer | Composition by weight (charge) | | | IV | Tg (° C.) |
|---|---|---|---|---|---|
| ID | MMA % | Comonomer* | % | (dL/g) | by DSC |
| 14 | 85 | HA | 15 | 0.45 | 90 |
| 15 | 85 | EHA | 15 | 0.47 | 92 |
| 16 | 85 | MeOEA | 15 | 0.57 | 94 |
| 17 | 80 | HMA | 20 | 0.44 | 93 |
| 18 | 80 | EHMA | 20 | 0.45 | 95 |

*HA: n-hexyl acrylate;
EHA: 2-ethylhexyl acrylate;
MeOEA: 2-methoxyethyl acrylate;
HMA: n-hexyl methacrylate;
EHMA: 2-ethylhexyl methacrylate Example 2

Preparation of Acrylic Copolymer Films by Solution Cast and Their Properties

Acrylic copolymer solutions were prepared by dissolving each solid acrylic copolymer prepared in Example 1 in either methyl ethyl ketone (MEK) or cyclopentanone (CPN). After mixing thoroughly, the resulting solutions were homogeneous and clear.

The acrylic copolymer solutions prepared above were applied to a flat glass substrate using the blade casting method to form coating films. The coating films were allowed to dry in air overnight and subsequently placed in a vacuum oven at room temperature (e.g., 20° C. to 23° C.) for 8 hours. After drying, the films were peeled off.

Birefringence and thickness of the free-standing films were measured by a Metricon Model 2010/M Prism Coupler using single film mode at a wavelength of 633 nm. The b* and haze values were measured by a HunterLab UltraScan VIS spectrophotometer in accordance with ASTM D1003-00. As shown in Tables 5-8, low b* and haze values were obtained for all films, indicating a high film clarity. The out-of-plane birefringence values ($\Delta n$ 633 nm) of the acrylic copolymer films are all slightly positive, comparable to a film of pure PMMA.

TABLE 5

Optical Properties of Cast Films of Copolymers of MMA and MA

| Film ID | Acrylic Copolymer ID | MMA:MA wt. ratio | Thickness (μm) | n 633 nm | Δn 633 nm | b* | Haze (%) |
|---|---|---|---|---|---|---|---|
| 20 | 1 | 80:20 | 10.1 | 1.4882 | 0.0001 | 0.15 | 0.10 |
| 21 | 2 | 78:22 | 9.7 | 1.4887 | 0.0005 | 0.15 | 0.12 |
| 22 | 3 | 70:30 | 10.2 | 1.4879 | 0.0005 | 0.14 | 0.15 |

TABLE 6

Optical Properties of Cast Films of Copolymers of MMA and EA

| Film ID | Acrylic Copolymer ID | MMA:EA wt. ratio | Thickness (μm) | n 633 nm | Δn 633 nm | b* | Haze (%) |
|---|---|---|---|---|---|---|---|
| 23 | 4 | 85:15 | 8.5 | 1.4894 | 0.0004 | 0.24 | 0.09 |
| 24 | 5 | 82:18 | 8.0 | 1.4891 | 0.0001 | 0.23 | 0.30 |
| 25 | 6 | 84:16 | 9.9 | 1.4877 | 0.0002 | 0.15 | 0.20 |
| 26 | 7 | 82:18 | 9.9 | 1.4881 | 0.0001 | 0.14 | 0.27 |
| 27 | 8 | 75:25 | 10.3 | 1.4874 | 0.0005 | 0.14 | 0.25 |

TABLE 7

Optical Properties of Cast Films of Copolymers of MMA and BA

| Film ID | Acrylic Copolymer ID | MMA:BA wt. ratio | Thickness (μm) | n 633 nm | Δn 633 nm | b* | Haze (%) |
|---|---|---|---|---|---|---|---|
| 28 | 9 | 90:10 | 10.0 | 1.4874 | 0.0004 | 0.15 | 0.21 |
| 29 | 10 | 87:13 | 10.1 | 1.4877 | 0.0004 | 0.16 | 0.15 |
| 30 | 11 | 84:16 | 9.8 | 1.4880 | 0.0005 | 0.15 | 0.10 |
| 31 | 12 | 84:16 | 9.3 | 1.4880 | 0.0004 | 0.14 | 0.12 |
| 32 | 13 | 82:18 | 10.0 | 1.4878 | 0.0007 | 0.16 | 0.28 |

TABLE 8

Optical Properties of Cast Films of Copolymer of MMA and Various Comonomers

| Film ID | Acrylic Copolymer ID | Copolymer Composition*; wt. ratio | Thickness (μm) | n 633 nm | Δn 633 nm | b* | Haze (%) |
|---|---|---|---|---|---|---|---|
| 33 | 14 | MMA:HA 85:15 | 10.8 | 1.4881 | 0.0002 | 0.15 | 0.16 |
| 34 | 15 | MMA:EHA 85:15 | 10.2 | 1.4886 | 0.0001 | 0.14 | 0.08 |
| 35 | 16 | MMA:MeOEA 85:15 | 10.6 | 1.4893 | 0.0004 | 0.15 | 0.09 |
| 36 | 17 | MMA:HMA 80:20 | 12.4 | 1.4879 | 0.0004 | 0.14 | 0.10 |
| 37 | 18 | MMA:EHMA 80:20 | 10.9 | 1.4884 | 0.0005 | 0.14 | 0.06 |

*HA: n-hexyl acrylate; EHA: 2-ethylhexyl acrylate; MeOEA: 2-methoxyethyl acrylate; HMA: n-hexyl methacrylate; EHMA: 2-ethylhexyl methacrylate

TABLE 9

Mechanical Properties of Cast Films of Copolymers of MMA and MA

| Film ID | Acrylic Copolymer ID | MMA:MA wt. ratio | Thickness (μm) | Young's Modulus (GPa) | Max Stress (MPa) | Elongation at Break (%) |
|---|---|---|---|---|---|---|
| 38 | 1 | 80:20 | 22.0 | 2.8 ± 0.1 | 74 ± 3 | 4.6 ± 0.5 |
| 39 | 2 | 78:22 | 22.5 | 2.9 ± 0.1 | 72 ± 3 | 7 ± 1 |
| 40 | 3 | 70:30 | 22.0 | 2.7 ± 0.1 | 67 ± 3 | 6 ± 2 |

TABLE 10

Mechanical Properties of Cast Films of Copolymers of MMA and EA

| Film ID | Acrylic Copolymer ID | MMA:EA wt. ratio | Thickness (μm) | Young's Modulus (GPa) | Max Stress (MPa) | Elongation at Break (%) |
|---|---|---|---|---|---|---|
| 41 | 4 | 85:15 | 20.5 | 2.6 ± 0.2 | 70 ± 7 | 7 ± 3 |
| 42 | 5 | 82:18 | 19.5 | 2.5 ± 0.2 | 66 ± 5 | 9 ± 1 |
| 43 | 6 | 84:16 | 24.0 | 2.5 ± 0.1 | 69 ± 4 | 5.7 ± 0.6 |
| 44 | 7 | 82:18 | 22.5 | 2.8 ± 0.1 | 67 ± 2 | 8 ± 3 |
| 45 | 8 | 75:25 | 22.5 | 2.5 ± 0.2 | 63 ± 4 | 12 ± 3 |

TABLE 11

Mechanical Properties of Cast Films of Copolymers of MMA and BA

| Film ID | Acrylic Copolymer ID | MMA:BA wt. ratio | Thickness (μm) | Young's Modulus (GPa) | Max Stress (MPa) | Elongation at Break (%) |
|---|---|---|---|---|---|---|
| 46 | 9 | 90:10 | 22.0 | 2.8 ± 0.2 | 73 ± 4 | 4.1 ± 0.3 |
| 47 | 10 | 87:13 | 24.0 | 2.7 ± 0.2 | 72 ± 3 | 4.6 ± 0.4 |
| 48 | 11 | 84:16 | 24.0 | 2.6 ± 0.1 | 68 ± 2 | 5.5 ± 0.3 |
| 49 | 12 | 84:16 | 22.5 | 2.6 ± 0.1 | 70 ± 2 | 7 ± 2 |
| 50 | 13 | 82:18 | 23.5 | 2.5 ± 0.2 | 71 ± 2 | 14 ± 3 |

Mechanical properties of the acrylic copolymer films were measured using an Instron instrument in film tension test mode in accordance with ASTM D882-02. The films used for the mechanical test were thicker than those used for the optical test. The Young's modulus, maximum tensile stress, and elongation at break for the acrylic copolymer films are listed in Tables 9-12.

TABLE 12

Mechanical Properties of Cast Films of Copolymers of MMA and Various Comonomers

| Film ID | Acrylic Copolymer ID | Copolymer Composition*; wt. ratio | Thickness (μm) | Young's Modulus (GPa) | Max Stress (MPa) | Elongation at Break (%) |
|---|---|---|---|---|---|---|
| 51 | 14 | MMA:HA 85:15 | 23.0 | 2.7 ± 0.1 | 72 ± 2 | 4.1 ± 0.2 |
| 52 | 15 | MMA:EHA 85:15 | 23.5 | 2.6 ± 0.2 | 70 ± 4 | 4.8 ± 0.4 |
| 53 | 16 | MMA:MeOEA 85:15 | 22.0 | 2.8 ± 0.1 | 72 ± 3 | 5.0 ± 0.5 |
| 54 | 17 | MMA:HMA 80:20 | 25.0 | 2.6 ± 0.2 | 74 ± 5 | 4.6 ± 0.3 |
| 55 | 18 | MMA:EHMA 80:20 | 24.5 | 2.4 ± 0.3 | 68 ± 7 | 4.4 ± 0.4 |

*HA: n-hexyl acrylate; EHA: 2-ethylhexyl acrylate; MeOEA: 2-methoxyethyl acrylate; HMA: n-hexyl methacrylate; EHMA: 2-ethylhexyl methacrylate Example 3

Preparation of PTFS/Acrylic Copolymer Films by Solution Cast and Their Properties Polymer blends were prepared using PTFS and acrylic copolymers at various ratios. Solutions (10 wt. % to 15 wt. %) were prepared by mixing PTFS powder and solid acrylic copolymers in cyclopentanone (CPN) at various weight ratios, such as acrylic copolymer/PTFS weight ratios of 60/40 wt. %, 70/30 wt. %, and 80/20 wt. % based on the total weight of the acrylic copolymer solids and the PTFS solids. After sufficient dissolving and mixing, the resulting solutions were homogeneous and clear.

The polymer blend solutions prepared above were applied to a flat glass substrate using the blade casting method to form coating films. The coating films were allowed to dry in air overnight and subsequently placed in a vacuum oven at 80° C. to 100° C. for 8 hours. After drying, the films were peeled off.

The b* and haze values were measured by a HunterLab UltraScan VIS spectrophotometer in accordance with ASTM D1003-00. As shown in Tables 13-16, low b* (e.g., less than 1) and low haze (e.g., less than 1.5%) were obtained for nearly all films, indicating high film clarity and good compatibility of the two polymers. The same polymer blend films were used for both the optical tests and the mechanical tests. The softening temperatures of the polymer blend films were measured by thermomechanical analysis (TMA) and are listed as "$T_g$ (° C.) by TMA" in Tables 13-16. These $T_g$ values are used for the determination of the stretching temperature of the polymer blend films and are not related to the $T_g$ values of the acrylic copolymers listed in Table 1-4, which were measured by DSC. The mechanical properties (i.e., Young's Modulus, maximum tensile stress, and elongation at break) of the PTFS/acrylic copolymer films are listed in Tables 13-16 and were measured in the same manner as the films of Example 2. As seen in Table 13, when the copolymer of MMA and MA has a ratio of 70/30 wt. % and the weight ratio of the acrylic copolymer to PTFS in the film increases, the haze of the film also increases. Accordingly, acrylic copolymers having less than 70 wt. % MMA are not suitable for use in the optical films of the present invention.

TABLE 13

Properties of PMMA-PMA/PTFS Blend Films

| Film ID | Acrylic Copolymer ID | PMMA:PMA wt. ratio | Acrylic:PTFS wt. ratio | d (μm) | Tg (° C.) by TMA | b* | Haze (%) | Young's Modulus (GPa) | Max Stress (Mpa) | Elongation at Break (%) |
|---|---|---|---|---|---|---|---|---|---|---|
| 56 | 1 | 80:20 | 60:40 | 41.5 | 148 | 0.21 | 0.11 | 2.9 ± 0.2 | 89 ± 5 | 5.9 ± 0.9 |
| 57 | | | 70:30 | 41.5 | 139 | 0.23 | 0.12 | 2.9 ± 0.2 | 82 ± 5 | 7 ± 1 |
| 58 | | | 80:20 | 34.0 | 134 | 0.25 | 0.24 | 2.9 ± 0.2 | 78 ± 5 | 8 ± 1 |
| 59 | 2 | 78:22 | 60:40 | 39.0 | 142 | 0.28 | 0.14 | 3.1 ± 0.2 | 89 ± 6 | 7.5 ± 0.9 |
| 60 | | | 70:30 | 41.5 | 133 | 0.35 | 0.29 | 3.0 ± 0.2 | 82 ± 6 | 9 ± 2 |
| 61 | | | 80:20 | 32.5 | 127 | 0.23 | 0.61 | 2.9 ± 0.2 | 78 ± 4 | 12 ± 2 |
| 62 | 3 | 70:30 | 60:40 | 38.5 | 142 | 0.46 | 0.45 | 2.9 ± 0.2 | 77 ± 4 | 7 ± 1 |
| 63 | | | 70:30 | 40.0 | 136 | 0.32 | 1.32 | 2.9 ± 0.2 | 74 ± 6 | 12 ± 4 |
| 64 | | | 80:20 | 32.5 | 126 | 0.15 | 2.24 | 3.0 ± 0.3 | 73 ± 7 | 11 ± 2 |

TABLE 14

Properties of PMMA-PEA/PTFS Blend Films

| Film ID | Acrylic Copolymer ID | PMMA:PEA wt. ratio | Acrylic:PTFS wt. ratio | d (μm) | Tg (° C.) by TMA | b* | Haze (%) | Young's Modulus (GPa) | Max Stress (MPa) | Elongation at Break (%) |
|---|---|---|---|---|---|---|---|---|---|---|
| 65 | 4 | 85:15 | 60:40 | 40.1 | 135 | 0.19 | 0.33 | 3.0 ± 0.2 | 89 ± 2 | 10 ± 1 |
| 66 | | | 70:30 | 44.8 | 128 | 0.23 | 0.23 | 2.8 ± 0.2 | 82 ± 4 | 12 ± 2 |
| 67 | 5 | 82:18 | 60:40 | 40.5 | 130 | 0.22 | 0.13 | 2.9 ± 0.1 | 85 ± 3 | 9.2 ± 0.9 |
| 68 | | | 70:30 | 45.8 | 124 | 0.22 | 0.34 | 2.8 ± 0.2 | 80 ± 4 | 15 ± 8 |
| 69 | 6 | 84:16 | 60:40 | 39.4 | 133 | 0.20 | 0.16 | 3.0 ± 0.1 | 88 ± 2 | 7.0 ± 0.5 |

TABLE 14-continued

Properties of PMMA-PEA/PTFS Blend Films

| Film ID | Acrylic Copolymer ID | PMMA: PEA wt. ratio | Acrylic: PTFS wt. ratio | d (μm) | Tg (° C.) by TMA | b* | Haze (%) | Young's Modulus (GPa) | Max Stress (MPa) | Elongation at Break (%) |
|---|---|---|---|---|---|---|---|---|---|---|
| 70 | | | 70:30 | 43.3 | 126 | 0.18 | 0.19 | 2.8 ± 0.2 | 81 ± 5 | 7.7 ± 0.4 |
| 71 | 7 | 82:18 | 60:40 | 46.0 | 132 | 0.22 | 0.08 | 2.9 ± 0.1 | 85 ± 3 | 8 ± 1 |
| 72 | | | 70:30 | 37.5 | 125 | 0.20 | 0.23 | 2.9 ± 0.1 | 82 ± 4 | 7.8 ± 0.6 |
| 73 | 8 | 75:25 | 60:40 | 39.0 | 125 | 0.18 | 0.15 | 2.9 ± 0.1 | 85 ± 2 | 7.5 ± 0.9 |
| 74 | | | 70:30 | 43.7 | 116 | 0.17 | 0.17 | 2.8 ± 0.1 | 78 ± 3 | 8 ± 2 |

TABLE 15

Properties of PMMA-PBA/PTFS Blend Films

| Film ID | Acrylic Copolymer ID | PMMA: PBA wt. ratio | Acrylic: PTFS wt. ratio | d (μm) | Tg (° C.) by TMA | b* | Haze (%) | Young's Modulus (GPa) | Max Stress (MPa) | Elongation at Break (%) |
|---|---|---|---|---|---|---|---|---|---|---|
| 75 | 9 | 90:10 | 60:40 | 41.5 | 141 | 0.20 | 0.31 | 3.1 ± 0.2 | 92 ± 5 | 5.2 ± 0.3 |
| 76 | | | 70:30 | 49.5 | 136 | 0.19 | 0.20 | 2.9 ± 0.2 | 83 ± 5 | 5.2 ± 0.8 |
| 77 | | | 80:20 | 38.5 | 129 | 0.18 | 0.25 | 3.0 ± 0.2 | 84 ± 4 | 5.2 ± 0.9 |
| 78 | 10 | 87:13 | 60:40 | 36.5 | 138 | 0.22 | 0.13 | 3.0 ± 0.2 | 83 ± 5 | 6.2 ± 0.8 |
| 79 | | | 70:30 | 41.5 | 132 | 0.21 | 0.13 | 3.0 ± 0.2 | 80 ± 5 | 7 ± 3 |
| 80 | | | 80:20 | 36.0 | 125 | 0.18 | 0.12 | 2.9 ± 0.2 | 75 ± 5 | 7 ± 2 |
| 81 | 11 | 84:16 | 60:40 | 36.5 | 134 | 0.21 | 0.19 | 3.0 ± 0.2 | 85 ± 7 | 5.8 ± 0.4 |
| 82 | | | 70:30 | 43.5 | 128 | 0.20 | 0.16 | 2.8 ± 0.2 | 78 ± 5 | 7 ± 1 |
| 83 | | | 80:20 | 36.0 | 120 | 0.18 | 0.10 | 2.8 ± 0.2 | 77 ± 5 | 7 ± 1 |
| 84 | 12 | 84:16 | 60:40 | 38.0 | 144 | 0.22 | 0.14 | 2.9 ± 0.2 | 86 ± 6 | 7 ± 1 |
| 85 | | | 70:30 | 43.0 | 139 | 0.23 | 0.08 | 2.9 ± 0.3 | 82 ± 5 | 9 ± 3 |
| 86 | | | 80:20 | 35.0 | 130 | 0.23 | 0.18 | 2.7 ± 0.2 | 75 ± 5 | 9 ± 2 |
| 87 | 13 | 82:18 | 60:40 | 45.5 | 135 | 0.23 | 0.31 | 2.9 ± 0.1 | 86 ± 5 | 6.1 ± 0.6 |
| 88 | | | 70:30 | 48.5 | 129 | 0.23 | 0.45 | 3.0 ± 0.3 | 82 ± 9 | 7 ± 1 |
| 89 | | | 80:20 | 39.5 | 124 | 0.19 | 0.52 | 2.8 ± 0.3 | 71 ± 8 | 7 ± 1 |

TABLE 16

Properties of Various PMMA-based Copolymers/PTFS Blend Films

| Film ID | Acrylic Copolymer ID | PMMA based Copolymer | Acrylic: PTFS wt. ratio | d (μm) | Tg (° C.) by TMA | b* | Haze (%) | Young's Modulus (GPa) | Max Stress (MPa) | Elongation at Break (%) |
|---|---|---|---|---|---|---|---|---|---|---|
| 90 | 14 | PMMA:PHA | 60:40 | 37.5 | 136 | 0.22 | 0.15 | 3.0 ± 0.3 | 87 ± 7 | 7.2 ± 0.7 |
| 91 | | 85:15 | 70:30 | 43.0 | 130 | 0.20 | 0.19 | 2.9 ± 0.3 | 86 ± 8 | 7.1 ± 0.8 |
| 92 | | | 80:20 | 35.0 | 124 | 0.17 | 0.12 | 2.8 ± 0.2 | 78 ± 6 | 6 ± 1 |
| 93 | 15 | PMMA:PEHA | 60:40 | 39.5 | 151 | 0.24 | 0.20 | 2.9 ± 0.2 | 83 ± 5 | 7.2 ± 0.6 |
| 94 | | 85:15 | 70:30 | 43.5 | 141 | 0.24 | 0.25 | 2.9 ± 0.3 | 85 ± 8 | 8 ± 1 |
| 95 | | | 80:20 | 36.5 | 134 | 0.20 | 0.24 | 2.7 ± 0.2 | 77 ± 5 | 9 ± 2 |
| 96 | 16 | PMMA:PMeOEA | 60:40 | 37.0 | 146 | 0.22 | 0.25 | 3.2 ± 0.2 | 89 ± 3 | 6.6 ± 0.6 |
| 97 | | 85:15 | 70:30 | 42.5 | 141 | 0.20 | 0.21 | 3.2 ± 0.2 | 89 ± 5 | 7.0 ± 0.8 |
| 98 | | | 80:20 | 33.0 | 135 | 0.17 | 0.15 | 3.1 ± 0.2 | 90 ± 5 | 8 ± 1 |
| 99 | 17 | PMMA:PHMA | 60:40 | 38.5 | 140 | 0.20 | 0.11 | 2.8 ± 0.3 | 81 ± 7 | 6.7 ± 0.6 |
| 100 | | 80:20 | 70:30 | 43.5 | 134 | 0.19 | 0.12 | 2.8 ± 0.3 | 83 ± 9 | 8 ± 1 |
| 101 | | | 80:20 | 37.0 | 128 | 0.16 | 0.17 | 2.7 ± 0.2 | 78 ± 5 | 6.8 ± 0.7 |
| 102 | 18 | PMMA:PEHMA | 60:40 | 38.0 | 153 | 0.21 | 0.24 | 2.8 ± 0.3 | 82 ± 8 | 6.9 ± 0.9 |
| 103 | | 80:20 | 70:30 | 43.0 | 145 | 0.20 | 0.14 | 2.7 ± 0.3 | 83 ± 9 | 6.8 ± 0.5 |
| 104 | | | 80:20 | 35.0 | 137 | 0.18 | 0.24 | 2.6 ± 0.2 | 78 ± 4 | 7 ± 2 |

Example 4

Stretching of Polymer Films and Their Properties

Selected polymer films prepared from acrylic copolymer/PTFS blends were each mounted on a stretching machine (Karo IV laboratory film stretcher available from Brückner Maschinenbau) equipped with a heating chamber. The film was pre-heated for 90 seconds to reach the desired stretching temperature ("Stretch Temp. (° C.)") and subsequently stretched in the machine direction (MD) or biaxially (i.e., stretched in both the MD and the transverse direction (TD)) at a desired speed (generally at 1%/sec) to a target stretch ratio L/L0, where L is the final length and L0 is the starting length. The transverse direction (TD) was constrained or unconstrained. The phase retardation ($R_e$: in-plane retardation; $R_{th}$: out-of-plane retardation) of the stretched film was measured by VASE® Ellipsometer (available from J. A. Woollam Co., Inc.) at a light wavelength of 550 nm. The results are listed in Tables 17-22.

Table 17 lists the properties of various stretched polymer blend films prepared from Acrylic Copolymer ID 2 (MMA:MA=78:22) in Table 1 and PTFS at a 70:30 (acrylic copolymer:PTFS) weight ratio.

TABLE 17

Properties of Stretched Films of Acrylic Copolymer ID 2 (MMA:MA = 78/22):PTFS (70:30)

| Film ID | Stretch Temp. (° C.) | MD(L/L0) × TD(L/L0) | Constrained, Unconstrained, or Biaxial | d (μm) | Re (nm) | Rth (nm) | Re/d (nm/μm) | Rth/d (nm/μm) | b* | Haze (%) |
|---|---|---|---|---|---|---|---|---|---|---|
| 105 | n/a | 1 × 1 | n/a | 49.0 | −0.8 | 70.6 | −0.02 | 1.44 | 0.31 | 0.70 |
| 106 | 125 | 2 | Unconstrained | 36.6 | −217.0 | 113.5 | −5.93 | 3.10 | 0.28 | 1.74 |
| 107 | 125 | 1.75 × 1 | Constrained | 27.0 | −85.8 | 97.4 | −3.18 | 3.61 | 0.20 | 0.97 |
| 108 | 125 | 2 × 1 | Constrained | 25.0 | −97.6 | 96.6 | −3.90 | 3.87 | 0.22 | 0.75 |
| 109 | 125 | 2.25 × 1 | Constrained | 22.3 | −101.3 | 95.3 | −4.54 | 4.27 | 0.20 | 1.05 |
| 110 | 125 | 1.4 × 1.4 | Biaxial | 27.5 | −1.4 | 100.2 | −0.05 | 3.64 | 0.19 | 0.85 |
| 111 | 125 | 1.5 × 1.5 | Biaxial | 23.5 | −2.8 | 94.1 | −0.12 | 4.01 | 0.17 | 0.99 |
| 112 | 135 | 2 × 1 | Constrained | 26.5 | −81.8 | 82.0 | −3.09 | 3.09 | 0.19 | 1.09 |

| | MD | | | TD | | | |
|---|---|---|---|---|---|---|---|
| Film ID | Young's Modulus (GPa) | Max Stress (MPa) | Elongation at Break (%) | Young's Modulus (GPa) | Max Stress (MPa) | Elongation at Break (%) | Note |
| 105 | 2.9 ± 0.2 | 70 ± 4 | 9 ± 1 | 2.9 ± 0.2 | 70 ± 4 | 9 ± 1 | MD, TD same |
| 106 | 3.0 ± 0.2 | 69 ± 4 | 5 ± 2 | NT | NT | NT | Too small for TD |
| 107 | 2.9 ± 0.1 | 67 ± 2 | 16 ± 5 | 2.9 ± 0.1 | 66 ± 2 | 21 ± 5 | |
| 108 | 2.9 ± 0.1 | 67 ± 3 | 19 ± 7 | 2.9 ± 0.2 | 66 ± 1 | 18 ± 11 | |
| 109 | 2.9 ± 0.2 | 69 ± 5 | 28 ± 12 | 2.9 ± 0.1 | 64 ± 4 | 22 ± 13 | |
| 110 | 2.9 ± 0.1 | 67 ± 4 | 29 ± 18 | 2.9 ± 0.1 | 67 ± 4 | 29 ± 18 | MD, TD same |
| 111 | 2.9 ± 0.1 | 67 ± 1 | 21 ± 10 | 2.9 ± 0.1 | 67 ± 1 | 21 ± 10 | MD, TD same |
| 112 | 2.9 ± 0.2 | 70 ± 3 | 27 ± 15 | 2.9 ± 0.2 | 65 ± 5 | 32 ± 32 | |

NT = Not Tested

Table 18 lists the properties of various stretched polymer blend films prepared from Acrylic Copolymer ID 2 (MMA:MA=78:22) in Table 1 and PTFS at a 60:40 (acrylic copolymer:PTFS) weight ratio.

TABLE 18

Properties of Stretched Films of Acrylic Copolymer ID 2 (MMA:MA = 78:22):PTFS (60:40)

| Film ID | Stretch Temp. (° C.) | MD(L/L0) × TD(L/L0) | Constrained, Unconstrained, or Biaxial | d (μm) | Re (nm) | Rth (nm) | Re/d (nm/μm) | Rth/d (nm/μm) | b* | Haze (%) |
|---|---|---|---|---|---|---|---|---|---|---|
| 113 | n/a | 1 × 1 | n/a | 42.3 | −0.5 | 95.6 | −0.01 | 2.26 | 0.24 | 0.29 |
| 114 | 135 | 2 | Unconstrained | 40.0 | −280.0 | 146.7 | −7.00 | 3.67 | 0.26 | 0.50 |
| 115 | 135 | 1.75 × 1 | Constrained | 28.0 | −103.3 | 125.0 | −3.69 | 4.47 | 0.21 | 0.41 |
| 116 | 135 | 2 × 1 | Constrained | 23.2 | −113.0 | 118.6 | −4.87 | 5.11 | 0.20 | 0.20 |
| 117 | 135 | 2.25 × 1 | Constrained | 21.2 | −127.2 | 121.8 | −6.00 | 5.75 | 0.20 | 0.20 |
| 118 | 135 | 1.4 × 1.4 | Biaxial | 23.9 | −0.6 | 117.0 | −0.03 | 4.89 | 0.19 | 0.41 |
| 119 | 135 | 1.5 × 1.5 | Biaxial | 20.0 | −1.0 | 112.8 | −0.05 | 5.64 | 0.20 | 0.47 |

Table 19 lists the properties of various stretched polymer blend films prepared from Acrylic Copolymer ID 7 (MMA:EA=82:18) in Table 2 and PTFS at a 70:30 (acrylic copolymer:PTFS) weight ratio.

TABLE 19

Properties of Stretched Films of Acrylic Copolymer ID 7 (MMA:EA=82:18):PTFS (70:30)

| Film ID | Stretch Temp. (° C.) | MD(L/L0) × TD(L/L0) | Constrained, Unconstrained, or Biaxial | d (μm) | Re (nm) | Rth (nm) | Re/d (nm/μm) | Rth/d (nm/μm) | b* | Haze (%) |
|---|---|---|---|---|---|---|---|---|---|---|

TABLE 19-continued

Properties of Stretched Films of Acrylic Copolymer ID 7 (MMA:EA=82:18):PTFS (70:30)

| 120 | n/a | 1 × 1 | n/a | 46.1 | −0.7 | 53.9 | −0.02 | 1.17 | 0.23 | 0.62 |
|---|---|---|---|---|---|---|---|---|---|---|
| 121 | 125 | 2 | Unconstrained | 37.6 | −242.0 | 128.2 | −6.44 | 3.41 | 0.21 | 0.38 |
| 122 | 125 | 2.5 | Unconstrained | 28.0 | −272.2 | 143.1 | −9.72 | 5.11 | 0.20 | 0.39 |
| 123 | 125 | 1.5 × 1 | Constrained | 30.9 | −87.6 | 114.8 | −2.84 | 3.71 | 0.20 | 0.56 |
| 124 | 125 | 2 × 1 | Constrained | 24.5 | −122.3 | 126.1 | −4.99 | 5.15 | 0.19 | 0.40 |
| 125 | 125 | 1.3 × 1.3 | Biaxial | 26.3 | −1.6 | 115.2 | −0.06 | 4.38 | 0.20 | 0.44 |
| 126 | 125 | 1.4 × 1.4 | Biaxial | 24.3 | −0.9 | 119.2 | −0.04 | 4.91 | 0.19 | 0.22 |
| 127 | 135 | 2 × 0.75 | Unconstrained | 33.0 | −203.8 | 109.8 | −6.18 | 3.33 | 0.20 | 0.40 |
| 128 | 135 | 2 | Unconstrained | 33.6 | −205.2 | 113.5 | −6.11 | 3.38 | 0.20 | 0.43 |
| 129 | 125 | 1.4 × 1.4 | Biaxial | 24.5 | −3.9 | 120.7 | −0.16 | 4.99 | NT | NT |
| 130 | 125 | 1.5 × 1.5 | Biaxial | 21.5 | −3.6 | 123.9 | −0.17 | 5.76 | NT | NT |
| 131 | 125 | 1.75 × 1 | Constrained | 26.0 | −104.6 | 117.1 | −4.02 | 4.51 | NT | NT |
| 132 | 125 | 2 × 1 | Constrained | 24.5 | −121.6 | 121.8 | −4.96 | 4.97 | NT | NT |
| 133 | 135 | 2 × 1 | Constrained | 24.5 | −97.0 | 98.6 | −3.96 | 4.02 | NT | NT |

| | MD | | | TD | | | |
|---|---|---|---|---|---|---|---|
| Film ID | Young's Modulus (GPa) | Max Stress (MPa) | Elongation at Break (%) | Young's Modulus (GPa) | Max Stress (MPa) | Elongation at Break (%) | Note |
| 120 | 2.8 ± 0.2 | 75 ± 5 | 5 ± 1 | 2.8 ± 0.2 | 75 ± 5 | 5 ± 1 | MD, TD same |
| 123 | 2.8 ± 0.1 | 70 ± 2 | 12 ± 3 | 2.8 ± 0.2 | 70 ± 1 | 8 ± 4 | |
| 125 | 2.8 ± 0.1 | 66 ± 5 | 6 ± 1 | 2.8 ± 0.1 | 66 ± 5 | 6 ± 1 | MD, TD same |
| 129 | 2.8 ± 0.1 | 69 ± 5 | 41 ± 19 | 2.8 ± 0.1 | 69 ± 5 | 41 ± 19 | MD, TD same |
| 130 | 2.8 ± 0.1 | 69 ± 5 | 38 ± 6 | 2.8 ± 0.1 | 69 ± 5 | 38 ± 6 | MD, TD same |
| 131 | 2.7 ± 0.1 | 69 ± 2 | 33 ± 11 | 2.8 ± 0.1 | 67 ± 2 | 19 ± 4 | |
| 132 | 2.8 ± 0.1 | 77 ± 5 | 28 ± 10 | 2.8 ± 0.1 | 69 ± 4 | 16 ± 5 | |
| 133 | 2.8 ± 0.1 | 77 ± 8 | 38 ± 10 | 2.8 ± 0.2 | 70 ± 6 | 33 ± 14 | |

Note:
The stretching rate for Film IDs 126 and 127 was 4%/sec.
NT = Not Tested

Table 20 lists the properties of various stretched polymer blend films prepared from Acrylic Copolymer ID 7 (MMA:EA=82:18) in Table 2 and PTFS at a 60:40 (acrylic copolymer:PTFS) weight ratio.

Table 21 lists the properties of various stretched polymer blend films prepared from Acrylic Copolymer ID 12 (MMA:BA=84:16) in Table 3 and PTFS at a 70:30 (acrylic copolymer:PTFS) weight ratio.

TABLE 20

Properties of Stretched Films of Acrylic Copolymer ID 7 (MMA:EA=82:18):PTFS (60:40)

| Film ID | Stretch Temp. | MD(L/L0) × TD(L/L0) | Constrained, Unconstrained, or Biaxial | d (μm) | Re (nm) | Rth (nm) | Re/d (nm/μm) | Rth/d (nm/μm) | b* | Haze (%) |
|---|---|---|---|---|---|---|---|---|---|---|
| 134 | n/a | 1 × 1 | n/a | 36.0 | −0.3 | 88.8 | −0.01 | 2.47 | 0.22 | 0.31 |
| 135 | 135 | 2 | Unconstrained | 32.0 | −309.5 | 162.2 | −9.67 | 5.07 | 0.21 | 0.47 |
| 136 | 135 | 2.5 | Unconstrained | 30.5 | −375.8 | 195.1 | −12.32 | 6.40 | 0.22 | 1.51 |
| 137 | 135 | 1.5 × 1 | Constrained | 26.3 | −95.3 | 130.9 | −3.62 | 4.98 | 0.21 | 1.11 |
| 138 | 135 | 2 × 1 | Constrained | 19.5 | −130.1 | 135.3 | −6.67 | 6.94 | 0.19 | 1.05 |
| 139 | 135 | 1.3 × 1.3 | Biaxial | 25.1 | −1.8 | 143.5 | −0.07 | 5.72 | 0.19 | 0.40 |
| 140 | 135 | 1.4 × 1.4 | Biaxial | 20.0 | −1.5 | 128.6 | −0.08 | 6.43 | 0.16 | 0.38 |

| | MD | | | TD | | | |
|---|---|---|---|---|---|---|---|
| Film ID | Young's Modulus (GPa) | Max Stress (MPa) | Elongation at Break (%) | Young's Modulus (GPa) | Max Stress (MPa) | Elongation at Break (%) | Note |
| 134 | 2.8 ± 0.1 | 72 ± 4 | 4 ± 1 | 2.8 ± 0.1 | 72 ± 4 | 4 ± 1 | MD, TD same |
| 135 | NT | NT | NT | NT | NT | NT | Too brittle to test |
| 136 | 2.8 ± 0.1 | 70 ± 2 | 3.9 ± 0.2 | NT | NT | NT | TD too small to test |
| 137 | 2.8 ± 0.1 | 64 ± 3 | 4.0 ± 0.8 | 2.8 ± 0.1 | 69 ± 3 | 9 ± 2 | |
| 138 | NT | NT | NT | NT | NT | NT | |
| 139 | 2.8 ± 0.2 | 71 ± 2 | 8.7 ± 0.7 | 2.8 ± 0.2 | 71 ± 2 | 8.7 ± 0.7 | MD, TD same |
| 140 | NT | NT | NT | NT | NT | NT | |

NT = Not Tested

TABLE 21

Properties of Stretched Films of Acrylic Copolymer ID 12 (MMA:BA=84:16):PTFS (70:30)

| Film ID | Stretch Temp. (° C.) | MD(L/L0) × TD(L/L0) | Constrained, Unconstrained, or Biaxial | d (μm) | Re (nm) | Rth (nm) | Re/d (nm/μm) | Rth/d (nm/μm) | b* | Haze (%) |
|---|---|---|---|---|---|---|---|---|---|---|
| 141 | n/a | 1 × 1 | n/a | 45.0 | −0.4 | 76.0 | −0.01 | 1.69 | 0.22 | 0.60 |
| 142 | 125 | 2 | Unconstrained | 34.3 | −264.8 | 140.8 | −7.72 | 4.10 | 0.22 | 1.21 |
| 143 | 125 | 2 × 1 | Constrained | 26.1 | −122.8 | 149.2 | −4.70 | 5.72 | 0.20 | 0.59 |
| 144 | 125 | 2.25 × 1 | Constrained | 20.3 | −118.2 | 115.5 | −5.82 | 5.69 | 0.19 | 0.49 |
| 145 | 125 | 1.75 × 1 | Constrained | 29.4 | −102.2 | 122.4 | −3.48 | 4.16 | 0.20 | 0.39 |
| 146 | 125 | 1.4 × 1.4 | Biaxial | 21.5 | −3.8 | 108.8 | −0.18 | 5.06 | 0.20 | 0.33 |
| 147 | 125 | 1.5 × 1.5 | Biaxial | 21.5 | −4.4 | 111.0 | −0.20 | 5.16 | 0.19 | 0.49 |
| 148 | 125 | 1.6 × 1.6 | Biaxial | 21.8 | −3.4 | 129.8 | −0.16 | 5.50 | 0.18 | 0.47 |
| 149 | 125 | 2 × 1 | Constrained | 23.6 | −114.5 | 120.0 | −4.85 | 5.08 | 0.20 | 0.28 |

| Film ID | MD Young's Modulus (GPa) | MD Max Stress (MPa) | MD Elongation at Break (%) | TD Young's Modulus (GPa) | TD Max Stress (MPa) | TD Elongation at Break (%) | Note |
|---|---|---|---|---|---|---|---|
| 141 | 2.7 ± 0.1 | 74 ± 5 | 7.7 ± 0.6 | 2.7 ± 0.1 | 74 ± 5 | 7.7 ± 0.6 | MD, TD same |
| 142 | 2.8 ± 0.1 | 67 ± 1 | 4.7 ± 0.2 | NT | NT | NT | TD too small to test |
| 143 | 3.0 ± 0.2 | 76 ± 2 | 13 ± 8 | 2.7 ± 0.1 | 69 ± 4 | 8 ± 4 | |
| 144 | 3.0 ± 0.2 | 79 ± 10 | 18 ± 8 | 2.8 ± 0.2 | 67 ± 8 | 14 ± 8 | |
| 145 | 2.9 ± 0.2 | 74 ± 4 | 12 ± 3 | 2.9 ± 0.2 | 69 ± 2 | 16 ± 10 | |
| 146 | 2.9 ± 0.1 | 70 ± 2 | 10 ± 3 | 2.9 ± 0.1 | 70 ± 2 | 10 ± 3 | MD, TD same |
| 147 | 2.9 ± 0.2 | 73 ± 4 | 11 ± 4 | 2.9 ± 0.2 | 73 ± 4 | 11 ± 4 | MD, TD same |
| 148 | 2.9 ± 0.2 | 69 ± 5 | 14 ± 5 | 2.9 ± 0.2 | 69 ± 5 | 14 ± 5 | MD, TD same |
| 149 | 3.0 ± 0.2 | 81 ± 9 | 22 ± 9 | 3.0 ± 0.2 | 70 ± 3 | 12 ± 6 | |

NT = Not Tested

Table 22 lists the properties of various stretched polymer blend films prepared from Acrylic Copolymer ID 12 (MMA: BA=84:16) in Table 3 and PTFS at a 60:40 (acrylic copolymer:PTFS) weight ratio.

TABLE 22

Properties of Stretched Films of Acrylic Copolymer ID 12 (MMA:BA=84:16):PTFS (60:40)

| Film ID | Stretch Temp. (° C.) | MD(L/L0) × TD(L/L0) | Constrained, Unconstrained, or Biaxial | d (μm) | Re (nm) | Rth (nm) | Re/d (nm/μm) | Rth/d (nm/μm) | b* | Haze (%) |
|---|---|---|---|---|---|---|---|---|---|---|
| 150 | n/a | 1 × 1 | n/a | 33.0 | −0.1 | 76.0 | −0.00 | 3.10 | 0.25 | 0.34 |
| 151 | 135 | 2 | Unconstrained | 29.9 | −301.1 | 140.8 | −10.07 | 5.22 | 0.22 | 0.73 |
| 152 | 135 | 1.75 × 1 | Constrained | 19.2 | −104.1 | 149.2 | −5.42μ | 6.59 | 0.20 | 0.46 |
| 153 | 135 | 2 × 1 | Constrained | 19.6 | −131.3 | 115.5 | −6.70 | 7.15 | 0.20 | 0.42 |
| 154 | 135 | 1.4 × 1.4 | Biaxial | 19.7 | −2.8 | 122.4 | −0.14 | 6.84 | 0.20 | 0.41 |
| 155 | 135 | 1.5 × 1.5 | Biaxial | 18.9 | −0.5 | 108.8 | −0.08 | 7.25 | 0.19 | 0.20 |

| Film ID | MD Young's Modulus (GPa) | MD Max Stress (MPa) | MD Elongation at Break (%) | TD Young's Modulus (GPa) | TD Max Stress (MPa) | TD Elongation at Break (%) | Note |
|---|---|---|---|---|---|---|---|
| 150 | 3.0 ± 0.1 | 84 ± 2 | 6 ± 1 | 3.0 ± 0.1 | 84 ± 2 | 6 ± 1 | MD, TD same |
| 151 | 3.0 ± 0.1 | 79 ± 1 | 4.6 ± 0.3 | NT | NT | NT | TD too small to test |
| 152 | 3.0 ± 0.1 | 76 ± 3 | 23 ± 8 | 3.0 ± 0.2 | 75 ± 2 | 11 ± 3 | |
| 153 | 3.0 ± 0.2 | 76 ± 6 | 12 ± 4 | 3.0 ± 0.2 | 74 ± 3 | 7 ± 2 | |
| 154 | 2.9 ± 0.1 | 73 ± 2 | 17 ± 4 | 2.9 ± 0.1 | 73 ± 2 | 17 ± 4 | MD, TD same |
| 155 | 3.0 ± 0.1 | 73 ± 3 | 22 ± 11 | 3.0 ± 0.1 | 73 ± 3 | 22 ± 11 | MD, TD same |

NT = Not Tested

The terminology as set forth herein is for description of the aspects of the invention only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a" "an," "the," and "at least one" are used interchangeably. Furthermore, as used in the description and the appended claims, the singular forms "a," "an," and "the" are inclusive of their plural forms, unless the context clearly indicates otherwise. Conversely, any reference to plural items shall, where appropriate, include the singular.

All percentages, parts, and ratios as used herein are by weight of the total composition, unless otherwise specified. All such weights as they pertain to listed ingredients are based on the active level and, therefore, do not include solvents or by-products that may be included in commercially available materials, unless otherwise specified.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use.

In embodiments of the present disclosure, it may be possible to utilize the various inventive concepts in combination with one another (e.g., one or more of the various embodiments may be utilized in combination with each other). Additionally, any particular element recited as relating to a particularly disclosed aspect of the present disclosure should be interpreted as available for use with all disclosed aspects of the present disclosure, unless incorporation of the particular element would be contradictory to the express terms of that aspect. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

What is claimed is:

1. An optical compensation film comprising:
   (a) poly($\alpha,\beta,\beta$-trifluorostyrene); and
   (b) an acrylic copolymer prepared by polymerization of monomers comprising:
      (i) methyl methacrylate (MMA) in an amount of 70 wt. % to 95 wt. %, based on the total weight of (i) and (ii); and
      (ii) one or more ethylenically unsaturated monomers other than MMA selected from the group comprising methyl acrylate, ethyl acrylate, n-butyl acrylate, n-hexyl acrylate, n-hexyl methacrylate, 2-methoxyethyl acrylate, 2-ethylhexyl acrylate, 2-ethylhexyl methacrylate, and combinations thereof, in an amount of 5 wt. % to 30 wt. %, based on the total weight of (i) and (ii),
   wherein said acrylic copolymer has a glass transition temperature ($T_g$) of 65° C. to 98° C., and wherein said optical compensation film has a haze less than 2.25%, an elongation at break of 5% to 15%, and a Young's modulus of 2 GPa to 4 GPa, measured at a film thickness of 15 μm to 50 μm.

2. The optical compensation film of claim 1, wherein the optical compensation film comprises:

(a) 20 wt. % to 50 wt. % poly($\alpha,\beta,\beta$-trifluorostyrene), based on the total weight of (a) and (b); and
   (b) 50 wt. % to 80 wt. % acrylic copolymer, based on the total weight of (a) and (b).

3. The optical compensation film of claim 1, wherein the optical compensation film comprises:
   (a) 30 wt. % to 45 wt. % of the poly($\alpha,\beta,\beta$-trifluorostyrene), based on the total weight of (a) and (b); and
   (b) 55 wt. % to 70 wt. % of the acrylic copolymer, based on the total weight of (a) and (b).

4. The optical compensation film of claim 1, wherein the acrylic copolymer comprises:
   (i) 80 wt. % to 90 wt. % of the MMA, based on the total weight of (i) and (ii); and
   (ii) 10 wt. % to 20 wt. % of the one or more ethylenically unsaturated monomers other than MMA, based on the total weight of (i) and (ii).

5. The optical compensation film of claim 1, wherein the one or more ethylenically unsaturated monomers other than MMA is selected from the group consisting of methyl acrylate, ethyl acrylate, n-butyl acrylate, 2-ethylhexyl acrylate, and combinations thereof.

6. The optical compensation film of claim 1, wherein the acrylic copolymer has a $T_g$ of 85° C. to 98° C.

7. The optical compensation film of claim 1, wherein the optical compensation film has a haze of less than 1.5%.

8. The optical compensation film of claim 1, wherein the optical compensation film has a haze of less than 0.5%.

9. The optical compensation film of claim 1, wherein the optical compensation film has an elongation at break of 7% to 15%.

10. The optical compensation film claim 1, wherein the optical compensation film has a Young's modulus of 2.5 GPa to 3.5 GPa.

11. The optical compensation film of claim 1, wherein the optical compensation film is prepared by solution cast.

12. The optical compensation film of claim 1, wherein the optical compensation film is prepared by extrusion.

13. The optical compensation film of claim 1, wherein the optical compensation film is uniaxially or biaxially stretched.

14. The optical compensation film of claim 13, wherein the stretched optical compensation film is a negative A-plate or a positive biaxial film having an in-plane retardation ($R_e$) of −80 nm to −300 nm and an out-of-plane retardation ($R_{th}$) of 40 nm to 200 nm at a film thickness of 15 μm to 30 μm, measured at a light wavelength of 550 nm.

15. A multilayer film comprising the negative A-plate of claim 14 and a positive A-plate having a refractive index profile of $n_x > n_y = n_z$ wherein $n_x$ and $n_y$ are in-plane refractive indices and $n_z$ is a thickness-direction refractive index.

16. A multilayer film comprising the positive biaxial film of claim 14 and a negative biaxial film having a refractive index profile of $n_x > n_y > n_z$ wherein $n_x$ and $n_y$ are in-plane refractive indices and $n_z$ is a thickness-direction refractive index.

17. An in-plane-switching (IPS) mode liquid crystal display (LCD) comprising the multilayer film of claim 16.

18. The optical compensation film of claim 13, wherein the stretched optical compensation film is a positive C-plate having an in-plane retardation ($R_e$) of −10 nm to 10 nm and an out-of-plane retardation ($R_{th}$) of 50 nm to 150 nm at a film thickness of 15 μm to 30 μm, measured at a light wavelength of 550 nm.

19. A multilayer film comprising the positive C-plate of claim 18 and a positive A-plate having a refractive index profile of $n_x > n_y = n_z$ wherein $n_x$ and $n_y$ are in-plane refractive indices and $n_z$ is a thickness-direction refractive index.

20. An organic light emitting diode (OLED) display comprising the multilayer film of claim 19.

\* \* \* \* \*